(12) United States Patent
Tso

(10) Patent No.: US 6,959,318 B1
(45) Date of Patent: Oct. 25, 2005

(54) METHOD OF PROXY-ASSISTED PREDICTIVE PRE-FETCHING WITH TRANSCODING

(75) Inventor: Michael M. Tso, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1050 days.

(21) Appl. No.: 09/036,699

(22) Filed: Mar. 6, 1998

(51) Int. Cl.[7] .............................................. G06F 15/16
(52) U.S. Cl. ...................................... 709/203; 709/229
(58) Field of Search ................................ 709/203, 229, 709/226, 227, 228, 223

(56) References Cited

U.S. PATENT DOCUMENTS

| | | | | | |
|---|---|---|---|---|---|
| 5,548,508 | A | * | 8/1996 | Nagami | 364/419.02 |
| 5,727,129 | A | * | 3/1998 | Barrett et al. | 395/12 |
| 5,802,292 | A | * | 9/1998 | Mogul | 709/203 |
| 5,903,727 | A | * | 5/1999 | Nielsen | 709/212 |
| 5,918,013 | A | * | 6/1999 | Mighdoll et al. | 709/217 |
| 5,956,039 | A | * | 9/1999 | Woods et al. | 345/419 |
| 5,974,371 | A | * | 10/1999 | Hirai et al. | 704/2 |
| 6,012,067 | A | * | 1/2000 | Sarkar | 707/103 |

OTHER PUBLICATIONS

Prefetching in world wide web by Wang et al., 1996 IEEE publication, pp. 28–32.*

Venkata N. Padmanabhan, Jeffrey C. Mogul. "Using Predictive Prefetching to Improve World Wide Web Latency", Computer Communication Review, ACM SIGCOMM, pp. 22–36, 1996.

Ian S. Graham. "The HTTP Protocol", HTML Source Book: A Complete Guide to HTML 3.0 (2d ed, 1996), pp. 377–417.

U.S. patent application Ser. No. 08/772,164, titled "System for Enhancing Data Access Over a Communications Link", by Tso et al., filed on Dec. 20, 1996.

U.S. patent application Ser. No. 08/799,654, titled "System for Scaling Image Data", by Tso et al., filed on Feb. 11, 1997.

U.S. patent application Ser. No. 08/925,276, titled "System for Dynamically Transcoding Data Transmitted Between Computers", by Tso et al., filed on Sep. 8, 1997.

U.S. patent application Ser. No. 08/928,645, titled "System for Collecting and Displaying Performance Improvement Information for a Computer", by Tso et al., filed on Sep. 12, 1997.

U.S. patent application Ser. No. 08/943,215, titled "Dynamically–Chainable Network Proxy", by Knauerhase et al., filed on Oct. 6, 1997.

U.S. patent application Ser. No. 08/957,468, titled "Method for Dynamically Determining Effective Speed of a Communications Link", by Knauerhase et al., filed on Oct. 24, 1997.

U.S. patent application Ser. No. 09/000,635, titled "Method for Auto–Fetch Protective Cache Replacement", by Jing et al., filed on Dec. 30, 1997.

(Continued)

Primary Examiner—Zarni Maung
(74) Attorney, Agent, or Firm—Kenneth M. Seddon

(57) ABSTRACT

Briefly, in accordance one embodiment of the invention, a method of suspending a network connection used for low priority transmissions between a client platform and a server platform includes: determining a characteristic of a transmission between the client platform and the server platform, said characteristic consisting essentially of a high priority transmission and a low priority transmission; and suspending the connection if the characteristic of the transmission comprises a high priority transmission briefly, in accordance with another embodiment, a method of using a network connection between a client platform and a server platform includes: producing on one of the platforms a list of Uniform Resource Locators (URLs) from a requested network page, said list comprising links in said requested network page; and pre-fetching via said connection at least one of said URLs to said remote proxy server.

14 Claims, 3 Drawing Sheets

OTHER PUBLICATIONS

U.S. patent application Ser. No. 09/000,636, titled "System for Transparent Recovery from Disruption of a Data Transfer", by Romrell, filed on Dec. 30, 1997.

U.S. patent application Ser. No. 09/000,709, titled "System for Delivery of Dynamic Content to a Client Device", by Tso et al., filed on Dec. 30, 1997.

U.S. patent application Ser. No. 09/000,711, titled "System for Dynamically Controlling a Network Proxy", by Knauerhase et al., filed on Dec. 30, 1997.

U.S. patent application Ser. No. 09/000,759, titled "Method and Apparatus for Dynamically Filtering Network Content", by Tso, filed on Dec. 30, 1997.

U.S. patent application Ser. No. 09/000,760, titled "System for Providing Non–Intrusive Dynamic Content to a Client Device", by Bakshi et al., filed on Dec. 30, 1997.

U.S. patent application Ser. No. 09/000,761, titled "Method for Reducing User–Visible Latency in HTTP Transactions", by Bakshi, filed on Dec. 30, 1997.

U.S. patent application Ser. No. 09/000,762, titled "Method for Detecting a User–Controlled Parameter from a Client Device Behind a Proxy", by Bakshi et al., filed on Dec. 30, 1997.

U.S. patent application Ser. No. 09/000,778, titled "System for Virus Checking Network Data", by Tso et al., filed on Dec. 30, 1997.

U.S. patent application Ser. No. 09/001,293, titled "System for Preventing Multiple Instances of the Same Dynamic Executable Module", by Bakshi et al., filed on Dec. 31, 1997.

U.S. patent application Ser. No. 09/001,294, titled "Method for Dynamic Determination of Client Communications Capabilities", by Bakshi et al., filed on Dec. 31, 1997.

U.S. patent application Ser. No. 09/002,164, titled "Method and Apparatus for Collecting Statistics from a Network Device", by Sathyanarayan et al., filed on Dec. 31, 1997.

* cited by examiner

METHOD OF PROXY-ASSISTED PREDICTIVE PRE-FETCHING WITH TRANSCODING

BACKGROUND

1. Field

The present invention relates to servers and, more particularly, to networked platforms.

2. Background Information

One problem with accessing the Internet using software executing on a computer, such as a personal computer (PC), referred to in this context as a browser, is the delay or latency perceived by users until the web site or web page being accessed is displayed on the computer screen. Recently, so-called "auto-fetch" utilities have gained popularity with users who routinely browse the World Wide Web (the Web). These utilities are designed to "guess" and retrieve web objects or data objects of particular interest to the user in the background (e.g., while the user is reading a web page), thereby reducing the user's visible latency for page loading if the pages they subsequently browse are already available in a local cache on their PC. Another application of this approach is often used in off-line browsers, which allows users to browse these cached web pages without being connected to the Internet. When the user accesses the Web through a network proxy, that is, a network device or platform executing proxy software employed to access the Web, however, such auto-fetch utilities may have an undesirable adverse effect on a proxy cache, that is, the local cache for a platform executing proxy software, that uses a conventional least-recently-used (LRU)-based replacement policy, for example. Since the auto-fetch utility may continuously generate arbitrary large numbers of requests for web objects to the network proxy, popular objects or pages for the majority of so-called "typical users," that is, those not using such auto-fetch utilities, are replaced by those objects requested by the auto-fetch utilities. As a result, typical users may experience a greater latency than they may otherwise, due at least in part to the abnormally large volumes of cached objects attributable to auto-fetch requests. A similar problem may also arise on a network server, such as a content server, which serves large numbers of users. Again, users may experience degraded performance when accessing such a server due at least in part to the inordinate resource demands of auto-fetching utilities.

Other on-line pre-fetching schemes have also been proposed to reduce the latency perceived by users by predicting and pre-fetching those web pages that are likely to be requested next, while the user is browsing through the currently displayed-web page. See, for example, "Using Predictive Pre-fetching to Improve World-Wide Latency", by V. Padmanabhann and J. C. Mogul, appearing in ACM SIGCOMM Computer Communication Review, pp. 22–36, 1996. The proposed scheme executes a prediction process on the server side to compute the probability or likelihood that a particular web page will be accessed next and conveys this information to the client. The client program executing on the client PC then decides whether or not to actually "pre-fetch" the page. Two recently introduced commercial products offer an on-line pre-fetching feature: Peak Net.Jet available from Peak Technologies Inc. and Blaze from Datatytics, Inc. Net.Jet does not rely on server computation information to make pre-fetching decisions. Instead, client Java code performs this operation. Blaze, however, implements a server side program to assist the pre-fetching.

Several problems exist with these proposed approaches. First, the server side program imposes extra computational load on already frequently overworked Web servers. In addition, technologies like Blaze employ the technique of making changes to all deployed Web servers in order to operate. However, these Web servers may number in the millions. Second, the technique employing pure client side pre-fetching typically generates a lot of network traffic and may jam Web servers with requests that may not ultimately improve performance.

A need therefore exists for a technique of predictive pre-fetching that overcomes the foregoing disadvantages.

SUMMARY

Briefly, in accordance one embodiment of the invention, a method of suspending a network connection used for low priority transmissions between a client platform and a server platform includes: determining a characteristic of a transmission between the client platform and the server platform, said characteristic consisting essentially of a high priority transmission and a low priority transmission; and suspending the connection if the characteristic of the transmission comprises a high priority transmission.

Briefly, in accordance with another embodiment, a method of using a network connection between a client platform and a server platform includes: producing on one of the platforms a list of Uniform Resource Locators (URLs) from a requested network page, said list comprising links in said requested network page; and pre-fetching via said connection at least one of said URLs to said remote proxy server.

DETAILED DESCRIPTION

Figure 1:
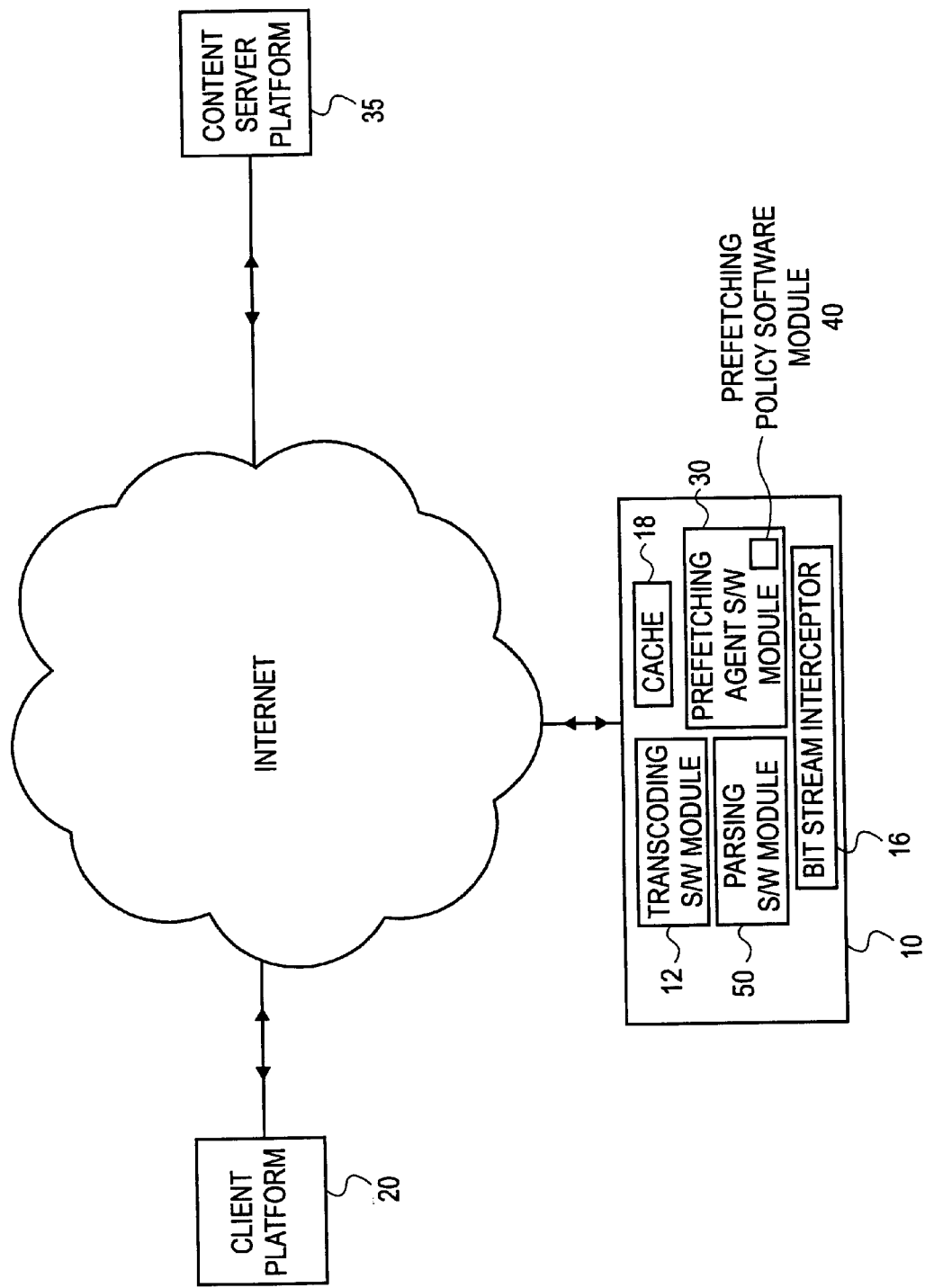
FIG. 1 is a schematic diagram illustrating an embodiment of a topology between platforms coupled or communicating via the Internet in which an embodiment of a method of proxy-assisted predictive pre-fetching in accordance with the present invention may be employed.

The embodiments of the present invention may be implemented according to the general architecture described, for example, in U.S. patent application Ser. No. 08/772,164, titled "System for Enhancing Data Access Over a Communications Link", by M. Tso, J. Jing, R. Knauerhase, D. Romrell, D. Gillespie and B. Bakshi, filed on Dec. 20, 1996, now U.S. Pat. No. 6,185,625; U.S. patent application Ser. No. 08/799,654, titled "System for Scaling Image Data", by M. Tso D. Romrell and S. Sathyanarayan, filed on Feb. 11, 1997; U.S. patent application Ser. No. 08/925,276, titled "System for Dynamically Transcoding Data Transmitted Between Computers", by M. Tso, T. Willis, J. Richardson, R. Knauerhase and D. Macielinski, filed on Sep. 8, 1997, now U.S. Pat. No. 6,421,733; U.S. patent application Ser. No. 08/943,215, titled "Dynamically-Chainable Network Proxy", by R. Knauerhase and M. Tso, filed on Oct. 6, 1997, now U.S. Pat. No. 6,345,303; U.S. patent application Ser. No. 08/957,468, titled "Method for Dynamically Determining Effective Speed of a Communications Link", by R. Knauerhase and M. Tso, filed on Oct. 24, 1997, now U.S. Pat. No. 6,215,774; U.S. patent application Ser. No. 09/000, 711, titled "System for Dynamically Controlling a Network Proxy", by R. Knauerhase, M. Tso, filed on Dec. 30, 1997, now U.S. Pat. No. 6,237,031; U.S. patent application Ser. No. 09/000,762, titled "Method for Detecting a User-Controlled Parameter from a Client Device Behind a Proxy", by B. Bakshi and M. Tso, filed on Dec. 30, 1997, now U.S. Pat. No. 6,345,300; U.S. patent application Ser. No. 09/001,294, titled "Method for Dynamic Determination of Client Communications Capabilities", by B. Bakshi, R. Knauerhase and M. Tso, filed on Dec. 31, 1997, now U.S. Pat. No. 6,311,215; U.S. patent application Ser. No. 09/000, 635, titled "Method for Auto-Fetch Protective Cache Replacement", by J. Jing and M. Tso, filed on Dec. 30, 1997; U.S. patent application Ser. No. 09/000,636, titled "System for Transparent Recovery from Disruption of a Data Transfer", by D. Romrell, filed on Dec. 30, 1997, now U.S. Pat. No. 6,396,805; U.S. patent application Ser. No. 09/000, 761, titled "Method for Reducing User-Visible Latency HTTP Transactions", by B. Bakshi, filed on Dec. 301997, now U.S. Pat. No. 6,457,054; U.S. patent application Ser. No. 09/000,760, titled "System for Providing Non-Intrusive Dynamic Content to a Client Device", by B. Bakshi, R. Knauerhase and M. Tso, filed on Dec. 30 1997, now U.S. Pat. No. 6,772,200; U.S. patent application Ser. No. 09/000, 759, titled "Method and Apparatus for Dynamically Filtering Network Content", by M. Tso. filed on Dec. 30, 1997, now U.S. Pat. No. 6,742,047; U.S. patent application Ser. No. 09/000,778, titled "System for Virus Checking Network Data by M. Tso and B. Baikshi, filed on Dec. 30, 1997, now U.S. Pat. No. 6,088,803; U.S. patent application Ser. No. 09/000,709, titled "System for Delivery of Dynamic Content to a Client Device", by M. Tso, D. Romrell and B. Bakshi, filed on Dec. 30, 1997, U.S. patent application Ser. No. 09/002,164, titled "Method and Apparatus for Collecting Statistics from a Network Device", by S. Sathyanarayan and R. Knauerhase, filed on Dec. 31, 1997; U.S. patent application Ser. No. 09/001,293, titled "System for Prevent Multiple Instances of the Same Dynamic Executable Module", by B. Bakshi and M. Tso, filed on Dec. 31 1997, now U.S. Pat. No. 6,101,328; and U.S. patent application Ser. No. 08/928,645, titled "System for Collecting and Displaying Performance Improvement Information for a Computer", by M. Tso, Ba. Bakshi and R. Knauerhase, filed on Sep. 12, 1997, now U.S. Pat. No. 6,247,050; all of which are assigned to the assignee of the present invention. Of course, the invention is not limited in scope to these embodiments.

Referring now to FIG. 1, according to one embodiment of the present invention, a network device or platform, such as remote server 10, may be coupled or communicate via the Internet with a client platform 20 and a content server platform 30. In this embodiment, remote server 10 includes software that, when executing, allows a client, such as client platform 20, to access the Internet, as explained in more detail below. Therefore, in this context, remote server 10 is referred to as a remote proxy server. Although the invention is not limited in scope in this respect, remote proxy server 10, also referred to in this context as a network device, may include software executing on the network device capable of parsing text or other information provided in the form of electronic signals, such as parsing software module 50. Likewise, remote server or remote proxy server 10 may also include software executing on the network device referred to in this context as a filtering module. In this particular embodiment, as suggested previously, the network device comprises a remote proxy server through which a plurality of client devices, such as client 20, for example, may access network resources, such as content server 30, for example. Of course, in other embodiments, network device 10 may comprise a client device, a content server, a network router, a bridge, a switch, or any other suitable data processing platform capable of being used in a communications network between a requesting client device and responding content server. As previously indicated, the parsing module and/or filtering module may be implemented as software modules executing on a network device or other platform, such as a PC, for example, including instructions for carrying out the particular functionality indicated. Remote proxy server 16 also includes bit stream interceptor 10, such as a proxy or protocol stack, pre-fetching agent software module 30 including pre-fetching software policy software 40, transcoding software module 12, and cache memory 18, as explained in more detail below.

In one embodiment, remote proxy server 10 may include a client preference table executed or executing in software coupled to communicate with or communicatively coupled with a parsing module and a filtering module. Although the invention is not restricted in scope in this respect, a client preference table may comprise in software, for example, a set of user controlled content selection criteria and preferences that may be indexed by a user name and/or an IP (Internet Protocol) address, for example. Each user name/IP address entry may optionally have an associated security password stored in the client preference table. According to this embodiment, when a user begins a session with remote proxy 10 for the first time, such as when client 20 requests a network data object via remote proxy server 10, use of client 20 may be employed to "sign-on" to proxy server 10. In this context, the term data object, web data object, or network data object refers to a set of related electrical data signals intended to be transmitted, stored, or received as a set.

Upon receipt of information identifying a user, such as a user name (e.g, user ID) or IP address, such as for client 20, for example, contained in a registration request packet, for example, the parsing software module may be adopted to attempt to retrieve from the client preference tables any previously stored filtering parameters for that user or client, although the invention is again not limited in scope in this respect. The parsing software module may optionally be configured to perform authentication processing to ensure the user is properly authorized to access the remote proxy server. Such authentication may be accomplished using any existing or later developed authentication mechanism. If previously stored filtering parameters are found in the preference table, the parsing software module executing on the network device may store those parameters in a dynamic table keyed, for example, by IP address. This dynamic table may then be used in connection with dynamic filtering of content received via proxy server 10 in the form of electrical signals to be passed to client 20 during a session. In this context, the term session refers to a continual or persistent communication connection between the client platform executing software and the remote platform executing software. In addition to the foregoing, the parsing software module may include instructions for validating any existing entries and client preferences upon receipt of more up-to-date user preference information.

Figure 3:
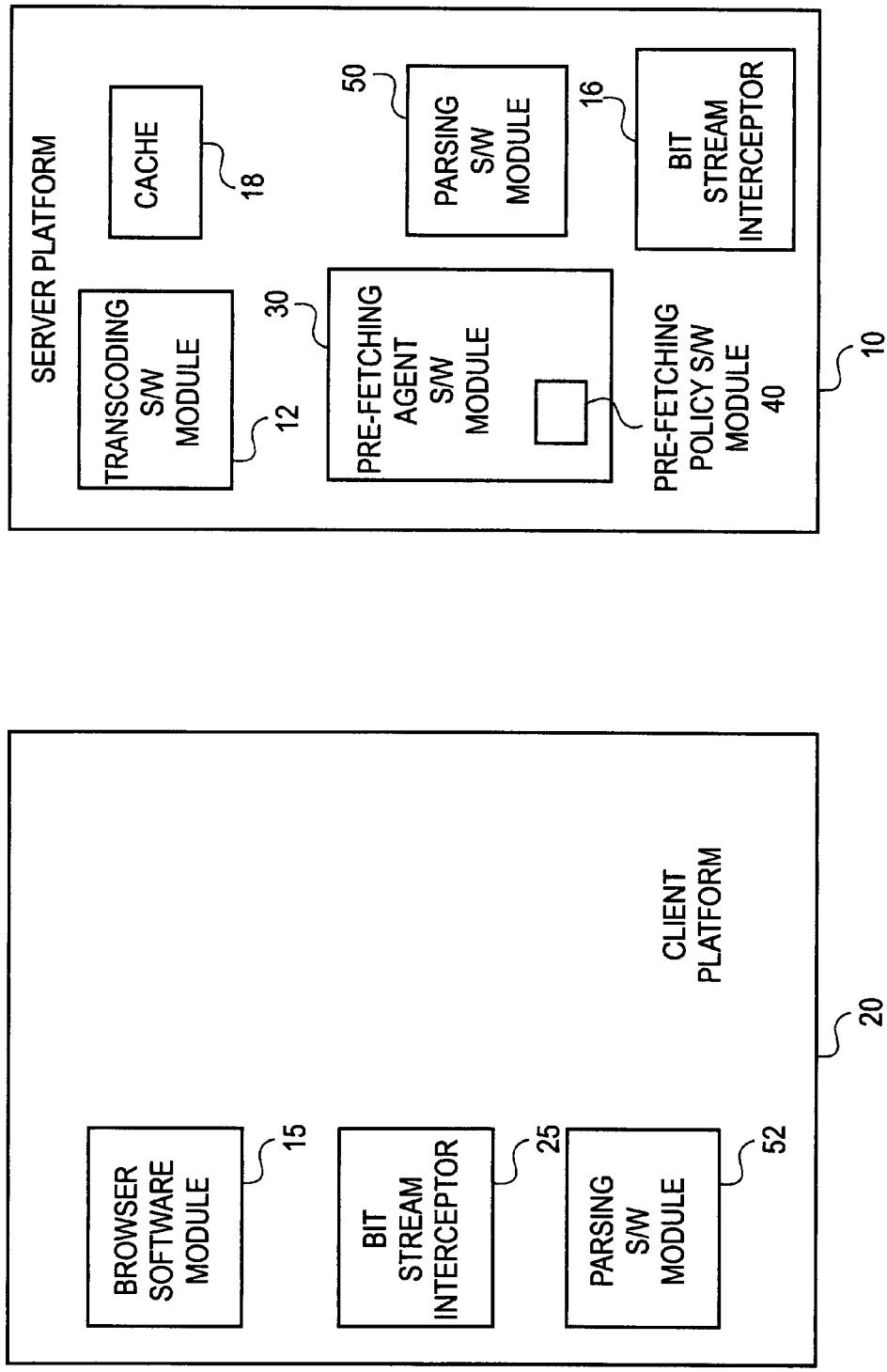
FIG. 3 is a schematic diagram illustrating selected software modules of the client and server platforms of FIG. 1.

Likewise, in one embodiment, client 20 may include browser software, such as module 15 illustrated in FIG. 3, executing on the network device, such as Netscape Navigator (™), for example, which enables a user of client 20 to retrieve and display network data objects, such as web pages, originating from, for example, content server 30.

Content server 30 may reside, for example, on the Internet and be accessible through standard HTTP (Hyper Text Transfer Protocol) messages, however, the present invention, of course, is not limited to any particular network or communications method or protocol.

It is well known to deploy a network proxy, or proxy server, as an intermediary between one or more client computers and a network, such as the Internet, for example. Network proxies are described generally in HTML Source Book: A Complete Guide to HTML 3.0 (2d Ed., 1996). by Ian S. Graham and available from Wiley Computer Publishing, New York, N.Y. The network proxy is commonly used in conjunction with so-called a "firewall" software module to protect a local area network (LAN) from unauthorized access over the Internet. Such a firewall, typically installed on a "gateway computer," that links a LAN to other networks, such as the Internet, restricts externally originated TCP/IP (Transmission Control Protocol/Internet Protocol) packets from entering the local network, thereby protecting local devices from hazards, such as unauthorized access. Network proxies are often used to address this shortcoming. A firewall, however, also prevents network users from directly accessing external resources, such as the Web.

Figure 2:
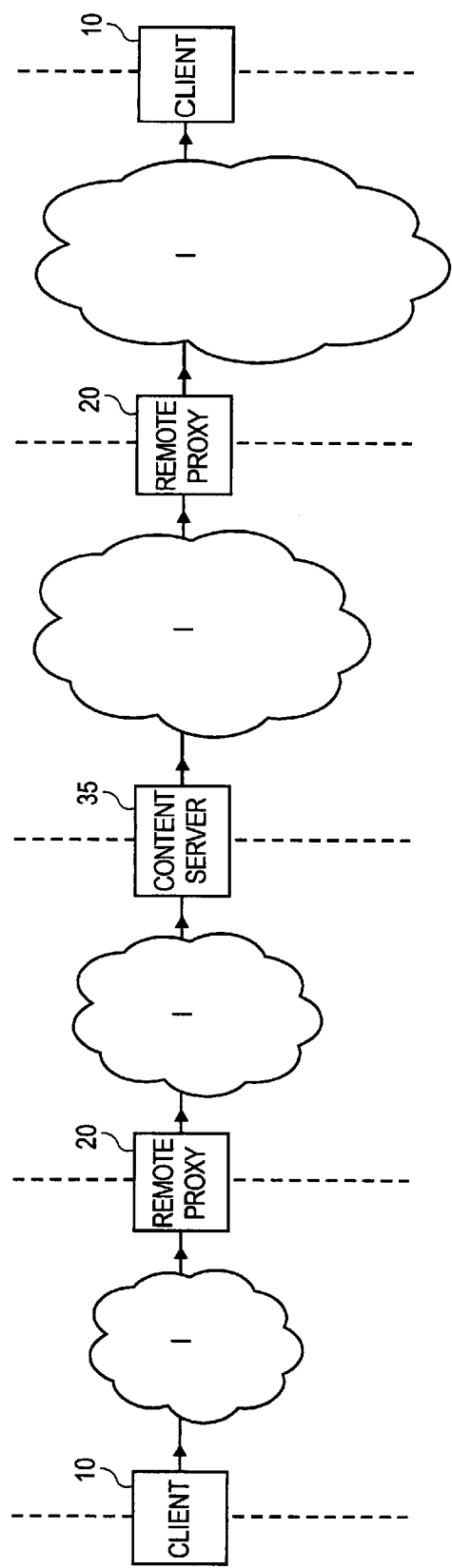
FIG. 2 is a schematic diagram illustrating the flow of signal information between the platforms of FIG. 1.

Network proxies are usually configured to have free access to both internal LAN resources and external resources, and include the capability to pass data in the form of electrical signals back and forth across the firewall. Users may then be given indirect access to Web resources by configuring the user's Web browser to reference the firewall proxy instead of external resources. When the Web browser is used to retrieve information in the form of electronic signals, such as packets, for example, from the other side of the firewall, it sends a request to the firewall proxy, which then completes the request and passes the result back via the firewall to the requesting device. This is illustrated by FIG. 2, for example.

While firewall/network proxy architecture effectively shields a LAN from external hazards, this two staged access procedure is often relatively slow. It is, therefore, common for a network proxy to cache retrieved Web pages. In this context, a cache refers to a locally accessible, high speed memory to which electronic signal information may be stored and from which it may be retrieved. Typically, cache memory is distinguished from system random access memory or even slower memories, such as a hard drive, for example. The act of storing signal information in one of these high-speed memories is referred to as caching. For example, the first time a document from the Web is requested, the network proxy retrieves the document and forwards it to the browser for a presentation to the user, but also retains a copy of the document in its own local cache memory. If the same or another user makes the subsequent request for that same document, the network proxy returns the locally-cached copy of the document instead of retrieving it from the Web. An example of a cache for use by a network proxy is described in "A Hierarchical Internet Object Cache" by A. Chankhunthod at al., Nov. 6, 1995 (available from the Computer Science Department of the University of Southern California).

As previously described, proxy software or a proxy server executing on a PC may be located on a networked device or platform, such as on the Internet or on a content server. In this context, the term platform refers to a hardware and software system on top of which a software application may reside. Typically, an operation occurs, such as completing a request for accessing information in the form of electronic signals via the Internet, more quickly if the proxy software is physically located either near or on the client device. As was previously described, one technique for improving or reducing the latency associated with accessing a web page is employing prefetching. In this context, pre-fetching refers to a process in which network data objects are retrieved and stored in local cache before a specific user request for that data object has occurred. However, one disadvantage of this approach is that the cache may get overloaded. For example, on a remote proxy server that is shared by a large number of users, where it or any users' client device also fetches embedded links on the web page, the cache may be overloaded disproportionately by a small number of users. When this occurs, more cache misses may occur, as previously described, and, therefore, reduce or degrade performance. A content server may experience a similar problems as well.

Nonetheless, a proxy server provides a number of advantages. In addition to the previous advantage described with respect to employing the proxy server as a firewall, It also has the advantage of saving cost on Internet links because caching reduces the desirability of fetching pages from remote content servers.

As previously described in previously referenced patent application Ser. No. 09/000,635, one technique for addressing some of the disadvantages of an "auto-fetch" utility is to monitor he IP address of the requester, for example. Then, if a disproportionate number of requests originate from a single source, such as above a predetermined threshold, in one embodiment, the cached web pages associated with that source will no longer be maintained in the cache of the particular platform. This technique may also be employed on a remote proxy server in order to perform better load balancing of its received requests for web pages or other network data objects.

Referring to FIG. 1, client device 20 includes software executing to communicate via a Internet connection with remote proxy server 10. As illustrated, an embodiment of network device assisted pre-fetching in accordance with the invention may be used advantageously to provide benefits similar to traditional client side pre-fetching methods, but without some of the previously described disadvantages. In one embodiment, as illustrated in FIGS. 1 and 2, the network device comprises a proxy server 10 including a cache 18, a prefetching agent software module 30, and a parsing software module 50. In this embodiment, instead of just sending requested URLs to the client, on the remote proxy servers, the parsing software module parses the HTML files and creates a list of URLs which were linked or embedded in the HTML file. The proxy server may then fetch some or all of the URLs in that list and store them in its cache, without first waiting for the client to issue requests for these URLs. This has the desirable effect of reducing end user visible latency because instead of fetching the information from the content server after the client requests the linked URLs, the content is stored in the proxy server's cache ready to download to the user when the user request comes. In addition, transcoding services, such as by module 12, such as language translation or compression, for example, may be performed on the data objects and cached, prior to the client requesting them. Caching of transcoded data objects may significantly speed up end user visible latency for applications, particularly on computationally intensive transcodings, such as on-the-fly language translation. In this context, the term transcoding refers to a process in which data signals coded for one particular medium are recoded so that they may be read, transmitted, stored and/or manipulated in another medium. In one embodiment, the proxy server would be multi-threaded or otherwise multitasking, such that pre-fetching and any subsequent transcode service applied to pre-fetched objects may take place in the background, while user requests are served as a relatively high priority. Prior to pre-fetching any URL, the pre-fetching agent may check to see if the data object it "points to" is stored in its cache already, and if it is, may check to see if it has "expired". In this context, the term expired refers to a period of time that a cache management system may allow to elapse before determining whether any update to the data object have taken place. This may occur many possible ways well known to one of ordinary skill in the art. If the cached data object hasn't expired, then no pre-fetching occurs. If it is expired, then the prefetching agent may attempt to check with the content server to see if the data object has changed, using methods such as "get HTTP header," which provides information in the terms of electronic signals regarding the last modified time and size. If the object hasn't changed, then the pre-fetching agent may reset the expired time according to any cache management process and no pre-fetching occurs. If the object has changed or has not been stored in the cache, then the prefetching agent may pre-fetch the data object from the content server.

One embodiment, as illustrated in FIGS. 1 and 2, may advantageously include a policy software module 40 to be used in conjunction with the pre-fetching agent software module. Policy software modules may be used to balance pre-fetching's undesirable effects with its benefits. In general, these modules when executed implement tradeoffs between data manipulation applications (such as transcoding or caching) and resource constraints (such as network bandwidth usage or cache memory usage). One example pre-fetching policy capable of being implemented includes, instead of pre-fetching all linked URLs on an HTML page, pre-fetching only the embedded URLs (e.g., images and applets, for example). Embedded URLs may be identified by their HTML tag. For example, images may be identified by the tag or their file extension and applets may be identified by the tag. Pre-fetching only embedded URLs is advantageous for both cache utilization and compression applications. Most browsers will automatically request embedded URLs on an HTML page, so little or no bandwidth is used unnecessarily by the remote proxy to perform pre-fetching. It provides an additional advantage of putting the images through compression(or other transcoding applications), which may be computationally intensive, prior to the browser issuing a request for the image. Another example pre-fetching policy includes selective pre-fetching based on the likelihood that a user will actually access the linked URL, to reduce bandwidth and cache space used unnecessarily. This policy could be implemented by examining how "popular" a link is. This information may be obtained, for example, by implementing a special HTTP protocol extension where the pre-fetch agent software module when executed obtains signal information about the probability of any link on the page being accessed from the content server. Then, depending on the load on the proxy server and the relative "cost" of bandwidth, the pre-fetching agent software module may, in execution, set a cut off probability so that the links whose reported probabilities are above that cut off are pre-fetched. In one embodiment, embedded URLs are set to a probability of 1 because browsers fetch them automatically. Also, different pre-fetching policy methods may be combined with others. These previously described pre-fetching policy methods are included for example purposes and do not limit the scope of the invention, of course.

For example, the probability may be advantageously calculated as follows using access frequency information that is already available to a server, although the invention is not limited in scope in this respect. The probability of a linked URL being followed is equal to the total number of accesses (call it "A") to the linked URL in a given time period, divided by the total number of accesses (call it "B") to the "parent" HTML (the one that contains the linked URL) during the same time period. If "A" is bigger than "B," then 1 is assigned to the probability. "A" may be bigger than "B" because the linked URL may be accessible without clicking a link on the parent HTML page (e.g., if a user types in the linked URL directly or it is linked from another page). The period of time before "A" and "B" gets reset may be advantageously chosen to start when either the content for either the linked URL or the parent HTML page are updated, or it may be periodically reset if the pages do not change often. Periodic resets of the time period may have the effect of keeping up with changes in user's browsing habits (e.g., as the content becomes less current, repeat visitors to the page may go down alternate linked URLs from those they had accessed on a prior visit). For content which Is dynamically generated (and, thus, certain objects may be different for different users), for example, for pages using cookies or ASP (active server pages), the server may optionally set the probability of the dynamically generated pages to "0" since there is little or no value in pre-fetching them.

Although a proxy server is used in the above description, it should be noted that other embodiments of the invention may be implemented on any network device capable of capturing the data signal stream and processing it. This particular embodiment employs a proxy server, but similar extensions may be implemented on other network devices, such as routers, switches, hubs, and bridges, for example.

Likewise, in this embodiment, the pre-fetching occurs up to one level of links, a similar technique may be applied recursively to the pages or other signal information that is pre-fetched. In one embodiment, the probability (and thus prioritization in the pre-fetching) advantageously decreases proportionally to the number of levels away from the page the user is currently accessing by multiplying the link probabilities. For example, the probability may be calculated as follows, although this approach makes several assumptions and where these assumptions are relaxed other approaches might be employed. Suppose HTML page A contains linked URL L1, which is itself an HTML page. Linked URL L1 contains a link to URL L2. Assume the platform calculation for probability of L1 access is P1, and for L2 is P2. The probability the pre-fetch agent software module would assign to L1 is P1 since it is on the current page. The probability the prefetch agent software agent would assign to L2 is P1×P2, since P2 can only be accessed if P1 is accessed first. This method may be repeated for arbitrary levels of links by simply multiplying the probabilities of all the"parent" pages. In the case where multiple parent pages are possible, the probabilities may be calculated for each parent, and then averaged.

In this embodiment, client device 20 also includes local proxy software, so that operations typically performed by the remote proxy server may be off loaded to the client device advantageously. For example, in an embodiment of a method of using a network connection, such as via the Internet, between a local client platform and a remote proxy server platform in accordance with the present invention, the local proxy on the client device may implement parsing, such as previously described. When executing on the local client platform, parsing software module may produce a list of URLs that are linked in the requested page, which is parsed first. The parsing software module when executing on the local client platform may then send a request to pre-fetch these URLs to the remote proxy server. The pre-fetch request may be different from a regular request, so that the pre-fetching agent 30 executing on the remote proxy server can prioritize it so that it is assigned with a lower priority than regular user requests, as described before. The request may also include user preference information, such as language preference, for example. Pre-fetch agent 30 optionally pre-fetches and transcodes the content according to such preferences, and transmits the signal information to the parsing software module, executing on the client platform. The parsing software receives these data signals stores it in a cache on the client. When the browser or other locally executing application requests this stored signal data, the local proxy, which is one mechanism, for example, for intercepting requests locally, retrieves it from the cache instead of retrieving it from the network, resulting in reductions in user visible latency. This is advantageous over current approaches where pre-fetch requests appear identical to regular requests, resulting in network devices, such as proxy caches and content servers behaving inefficiently.

Although a local proxy implementation on a client platform, for example, is referenced in the previous description, this invention is not limited in scope to a proxy implementation. All client software that is capable of both intercepting network requests on the client, and implementing the pre-fetching protocol, as described, while executing on a platform would suffice. Other examples where this capability may be implemented on a platform include protocol stacks (e.g. TCP/IP), network interface card drivers, or browsers.

As previously suggested, one advantage of employing this approach with a client device is that load balancing is performed between the client device and the remote proxy server. In addition, where local proxy software is executed on the client device, this also provides compatibility between the browser on the client device and the remote proxy server. Without the local proxy executing on the client device, the browser on the client device may not be able to format pre-fetch requests differently from regular or typical user requests to the remote proxy server.

In yet another embodiment, when the client parsing software module 40 transmits a prefetching request to the pre-fetch agent software executing on the remote proxy server, the prefetching agent makes a determination regarding whether a given URL in the pre-fetching request is located in the cache of the remote proxy server. If the URL in the cache on the remote proxy, then the content of the URL may be transmitted to the client device. Alternatively, if the URL is not found in the cache, the remote proxy server transmits a "not found" message to the client device. This could be implemented as a pre-fetching policy where all pre-fetch URLs are assigned probability 0 (meaning never implement the request) unless they are in the cache, in which case they are assigned probability 1 (meaning always implement the request). An advantage of this approach is that it effectively implements pre-fetching without increasing traffic between the proxy and content servers. Keeping traffic and congestion reduced is a desirable attribute for networking and Internet-related technology.

Another advantageous capability may be implemented using the ability to distinguish low priority requests, such as pre-fetch requests, from high priority requests, such as regular requests. In an embodiment of a method of suspending a pre-fetched transmission between a local proxy client platform and a remote proxy server platform in accordance with the present invention, the local proxy client and the remote proxy server maintain a low priority transmission persistent network connection, such as via the Internet, such that low priority pre-fetched transmissions may be suspended or stopped relatively quickly once a high priority browser request transmission Is transmitted between the local and remote proxies. Once the pre-fetching transmission is stopped, the connection may be optionally closed or left open for use next time to avoid connection creation overhead. The local proxy executing on the client device may begin a new parsing process for the new requested browser page or data object and optionally establish another persistent preemptive pre-fetching connection with the remote proxy server or alternatively reuse the existing connection. It is desirable in order to quickly suspend the persistent connection that the relative size of the transmissions between the proxies be relatively small, such as on the order of 512 or 1024 bytes for Plain Old Telephone Service (POTS) connections. The desirable packet size is related to a function of the bandwidth of the effective usable bandwidth between the network device and the client, approximately the amount of bytes that may be transmitted in a small time frame, such as 1 second or 500 milliseconds. The effective usable bandwidth across an Internet connection may be computed, such as described, for example, in previously referenced patent application Ser. No. 08/957,468, now U.S. Pat. No. 6,215,774. In this context, the desirable packet equals the desired time frame (e.g., 1 second) divided by the effective usable bandwidth. The reason this results in a relatively quick suspension of the connection is because typically a packet that is in transmission is completed before a new packet is transmitted. Alternatively, in another embodiment, a special escape character or other out of band signaling, for example, may be employed in the signal stream so that the transmission may be terminated once the special character or signal is received, without waiting for the packet to complete. Typically, it is desirable if the preemptive pre-fetching transmission not coexist with a browser request transmission because otherwise this will slow the "regular" browser request transmissions. Thus, the desirability of suspending the persistent preemptive connection between the local and remote proxies.

An advantage of employing this preemptive pre-fetching approach is a more efficient use of available bandwidth between the client device and the remote proxy server. Without this approach, regular browser requests compete with pre-fetching requests. Therefore, bandwidth may already be exhausted or utilized by pre-fetching requests when a user makes a request for a web page. This is an undesirable outcome because it increases the perceived latency experienced by the user. However, in the embodiment previously described, if the local proxy obtains a request from the user via the client device, a request is transmitted to the remote proxy server to stop pre-fetching so that the browser request may instead be accommodated. Therefore, advantages with regard to bandwidth management prioritization and resource allocation are accomplished. Ultimately, the latency that the user experiences when requesting a web page will be reduced.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method of using a network connection between a client platform and a server platform comprising:

producing on one of the platforms a list of Uniform Resource Locators (URLs) from a requested network page, said list comprising links in said requested network page; and pre-fetching via said connection at least one of said URLs to a remote proxy server.

2. The method of claim 1, wherein the client platform comprises one of a personal computer (PC), a router, a switch, a bridge and a hub.

3. The method of claim 1, wherein the server platform comprises one of a personal computer (PC), a router, a switch, a bridge and a hub.

4. The method of claim 1, pre-fetching at least one of said URL's includes transcoding the fetched object corresponding to the at least one of said URL's.

5. The method of claim 4, transcoding the fetched object includes transcoding it in accordance with a user determined preference.

6. The method of claim 5, wherein producing a list of URLs from a requested network page includes parsing the requested network page.

7. The method of claim 4, wherein the list of URLs is produced on the client.

8. The method of claim 4, wherein the list of URLs is produced on the server.

9. The method of claim 8, wherein pre-fetching said URLs comprises pre-fetching in attendance with a substantially predetermined pre-fetching policy.

10. A network comprising:

a first platform and a second platform;

said platforms being adapted to parse a list of URLs from a requested network data object and to pre-fetch via said network connection said URLs to a remote proxy server.

11. The network of claim 10, wherein at least one of said platforms comprises one of a personal computer (PC), a server, a client, a router, a hub, a bridge and a switch.

12. An article comprising:

a machine readable storage medium having stored thereon instructions capable of being executed by a data processing platform, said instructions being adapted to parse a list of URLs from a received network data object and to pre-fetch via a network connection said URLs to a remote platform in accordance with a pre-determined pre-fetching policy.

13. The article of claim 10, wherein either of said platforms comprises any one of a client, a server, a router, a hub, a bridge and a switch.

14. The article of claim 12, wherein said instructions are included in any one of a browser, a network card driver, a protocol stack, and a proxy.

* * * * *